United States Patent
Abdo (10) Patent No.: US 9,983,336 B2
(45) Date of Patent: *May 29, 2018

(54) LOW-LOSS INFRARED FILTER FOR MICROWAVE MEASUREMENT WHICH INTEGRATES A DISTRIBUTED BRAGG REFLECTOR INTO A MICROWAVE TRANSMISSION LINE

(71) Applicant: International Business Machines Corporation, Armonk, NY (US)

(72) Inventor: Baleegh Abdo, Carmel, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 14/867,326

(22) Filed: Sep. 28, 2015

(65) Prior Publication Data
US 2017/0090080 A1   Mar. 30, 2017

(51) Int. Cl.
| | |
|---|---|
| *H01P 3/08* | (2006.01) |
| *G02B 5/20* | (2006.01) |
| *H01P 3/06* | (2006.01) |
| *G02B 27/42* | (2006.01) |
| *G02B 5/18* | (2006.01) |
| *H01P 11/00* | (2006.01) |

(52) U.S. Cl.
CPC ........... *G02B 5/208* (2013.01); *G02B 5/1861* (2013.01); *G02B 27/4244* (2013.01); *H01P 3/06* (2013.01); *H01P 3/085* (2013.01); *H01P 11/001* (2013.01)

(58) Field of Classification Search
CPC ................................... H01P 1/201; H01P 3/08
USPC .......................................... 333/238, 246, 202
See application file for complete search history.

(56) References Cited

U.S. PATENT DOCUMENTS

| | | |
|---|---|---|
| 7,005,669 B1 | 2/2006 | Lee |
| 7,132,676 B2 | 11/2006 | Shields et al. |
| 7,456,702 B2 | 11/2008 | Keefe et al. |
| 7,910,954 B2 | 3/2011 | Hansson |
| 9,589,236 B1* | 3/2017 | Abdo ................... G06N 99/002 |
| 9,691,962 B2* | 6/2017 | Abdo ................... G06N 99/002 |
| 2014/0266513 A1 | 9/2014 | Abraham et al. |
| 2014/0326902 A1 | 11/2014 | Tahan et al. |

OTHER PUBLICATIONS

A. Corcoles, et al., "Protecting Superconducting qubits from radiation," Applied Physics Letters, 99, 181906, Nov. 2011, pp. 1-3.

(Continued)

*Primary Examiner* — Stephen E Jones
(74) *Attorney, Agent, or Firm* — Cantor Colburn LLP; Vazken Alexanian (57) ABSTRACT

A technique relates to a microwave device. A microwave system is configured to output a microwave readout signal, where the microwave system has an input and an output. An output microwave transmission line is connected to the output of the microwave system. A distributed Bragg reflector, integrated into a transmission line geometry, is configured as a low-loss infrared filter that blocks infrared radiation while allowing transmission of the microwave readout signal. The low-loss infrared filter is connected to the output microwave transmission line.

11 Claims, 6 Drawing Sheets

(56) References Cited

OTHER PUBLICATIONS

Baleegh Abdo, "High Fidelity and High Efficiency Qubit Readout Scheme," U.S. Appl. No. 14/867,342, filed Sep. 28, 2015.
C. Scheller, et al., "Silver-epoxy microwave filters and thermalizers for millikelvin experiments," Applied Physics Letters, 104, 211106, May 2014, pp. 1-5.
D. Slichter, et al., "Millikelvin thermal and electrical performance of lossy transmission line filters," Applied Physics Letters, 94, 192508, 2009, pp. 1-4.
D. Vion, et al., "Miniature electrical filters for single electron devices," Journal of Applied Physics, 77, (6), Mar. 15, 1995, pp. 2519-2524.
J. Martinis, et al., "Experimental Tests for the Quantum Behavior of a Macroscopic Degree of Freedom: The phase Difference across a Josephson Junction," Physical Review B, vol. 35, No. 10, Apr. 1, 1987, pp. 4682-4698.
List of IBM Patents or Patent Applications Treated as Related; Filed: Sep. 28, 2015, pp. 1-2.
Baleegh Abdo, "Low-Loss Infrared Filter for Microwave Measurement Which Integrates a Distributed Bragg Reflector Into a Microwave Transmission Line", U.S. Appl. No. 14/950,333, filed Nov. 24, 2015.
Baleegh Abdo, "High Fidelity and High Efficiency Qubit Readout Scheme", U.S. Appl. No. 14/867,342, filed Sep. 28, 2015.
Baleegh Abdo, "High Fidelity and High Efficiency Qubit Readout Scheme", U.S. Appl. No. 14/950,349, filed Nov. 24, 2015.
Baleegh Abdo, "High Fidelity and High Efficiency Qubit Readout Scheme," U.S. Appl. No. 15/414,940, filed Jan. 25, 2017.
Baleegh Abdo, "High Fidelity and High Efficiency Qubit Readout Scheme," U.S. Appl. No. 15/495,220, filed Apr. 24, 2017.
List of IBM Patents or Patent Applications Treated as Related; Filed: Aug. 7, 2017, pp. 1-2.

\* cited by examiner

LOW-LOSS INFRARED FILTER FOR MICROWAVE MEASUREMENT WHICH INTEGRATES A DISTRIBUTED BRAGG REFLECTOR INTO A MICROWAVE TRANSMISSION LINE

BACKGROUND

The present invention relates to measurement techniques of sensitive microwave circuits, such as quantum superconducting circuits, which require protection from infrared radiation in a certain bandwidth without degrading the signal to noise ratio of the microwave signals feeding or measuring these circuits, and more specifically, relates to a low-loss infrared filter implemented as a distributed Bragg reflector in a microwave transmission line, e.g., of a stripline geometry.

In one approach called circuit quantum electrodynamics, quantum computing employs active superconducting devices called qubits to manipulate and store quantum information, and resonators (e.g., as a two-dimensional (2D) planar waveguide or as a three-dimensional (3D) microwave cavity) to read out and facilitate interaction among qubits. As one example, each superconducting qubit may comprise one or more Josephson junctions shunted by capacitors in parallel with the junctions. The qubits are capacitively or inductively coupled to 2D or 3D microwave cavities. The electromagnetic energy associated with the qubit is stored in the Josephson junctions and in the capacitive and inductance elements forming the qubit. To date, a major focus has been on improving lifetimes of the qubits in order to allow calculations (i.e., manipulation and readout) to take place before the information is lost due to decoherence of the qubits. Currently, the coherence times of superconducting qubits can be as high as 100 microseconds, and efforts are being made to increase their coherence times.

SUMMARY

According to one embodiment, a microwave apparatus is provided. The apparatus includes a microwave system configured to output a microwave readout signal. The microwave system has an input and an output. An output microwave transmission line is connected to the output of the microwave system. A distributed Bragg reflector, integrated into a transmission line geometry, is configured as a low-loss infrared filter that blocks infrared radiation while allowing transmission of the microwave readout signal. The low-loss infrared filter is connected to the output microwave transmission line.

According to one embodiment, a method of configuring a microwave apparatus is provided. The method includes providing a microwave system configured to output a microwave readout signal, where the microwave system has an input and an output, and connecting an output microwave transmission line to the output of the microwave system. Also, the method includes configuring a distributed Bragg reflector, integrated into a transmission line geometry, as a low-loss infrared filter that blocks infrared radiation while allowing transmission of the microwave readout signal. The low-loss infrared filter is connected to the output microwave transmission line.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Quantum systems such as superconducting qubits are very sensitive to electromagnetic noise, in particular in the microwave and infrared domains. In order to protect these quantum systems from microwave and infrared noise, several layers of filtering, attenuation, and isolation are applied. Of particular interest are the layers of protection employed on the input and output (I/O) lines, also called transmission lines, that are connected to the quantum system, and carry the input and output signals to and from the quantum system respectively.

In the case of superconducting qubits, these I/O lines (transmission lines) are microwave coaxial lines or waveguides. Some of the techniques or components that are used in order to block or attenuate the noise propagating or leaking into these transmission lines are attenuators, circulators, isolators, low pass microwave filters, band pass microwave filters, and infrared filters which are based on lossy absorptive materials. However, using these lossy infrared filters on the output line is undesirable because the lossy infrared filters considerably degrade the signal-to-noise ratio (SNR) of the microwave signal that is used in the measurement of the quantum system.

Embodiments are configured to realize a low-loss infrared filter. The low-loss infrared filter blocks infrared radiation in the unwanted band that can negatively affect the quantum system, while simultaneously allowing microwave signals (e.g., (microwave) band 1-15 GHz commonly used for qubit readout and measurement) to be transmitted through the infrared filter with minimum loss.

Ideally, superconducting qubits need to be completely protected and isolated from unwanted electromagnetic signals and noise irradiated at them from the environment or carried by the input and output lines coupled to them. One example of such unwanted noise is blackbody radiation coming down the input and output lines which originates from room-temperature equipment or microwave components that reside at higher stages in the dilution fridge such as the 4 kelvin (K) plate. Hence, the spectrum of noise which qubits need to be protected against can be very broad extending from tens of gigahertz to tens or even hundreds of terahertz.

To better understand the spectrum of thermal noise that is most relevant to the noise carried by the input and output lines which pass through the different temperature stages of a dilution fridge, consider the simple case of a resistor R at temperature T. The RMS (root mean square) voltage created at the terminals of the resistor due to thermal noise is given by Planck's blackbody radiation law, $$V_n^{rms} = \sqrt{\frac{4hfBR}{e^{hf/kT} - 1}},$$

where h is Planck's constant, k is Boltzmann's constant, B is the bandwidth of the system, and f is the frequency of the noise within the bandwidth B. Furthermore, the maximum available noise power from this noisy resistor is obtained by connecting it to a load of equal resistance $$P_n = \left(\frac{V_n^{rms}}{2R}\right)^2 R,$$

which gives $$P_n = \frac{hfB}{e^{hf/kT} - 1}.$$

Although, this expression for $P_n$ does not exactly describe the noise entering the qubit system, mainly because the qubit is not a load of resistance R and it is not directly coupled to the input and output lines (i.e. it is dispersively coupled to a resonator which in turn is coupled to the input and output lines), this expression for $P_n$ shows however in a rather simple manner the interrelationship between the temperature of a resistor and the resultant noise spectrum.

The low-loss infrared filter in embodiments may be utilized in the readout of solid state qubits such as superconducting qubits or quantum dots, and may also be utilized in the readout of any quantum system working in the microwave domain which requires protection from infrared radiation in a certain bandwidth. For example, the low-loss infrared filter may be used on the output lines of qubits in order to protect their quantum state from infrared radiation in the certain bandwidth of interest without degrading the signal-to-noise ratio of the output microwave signal measuring the qubit.

Also, embodiments may be applied to improve the sensitivity of microwave measurements in the areas of astronomy and cosmology, and the low-loss infrared filter may be utilized in the transmission lines of the microwave systems in these areas.

In microwave quantum systems such as superconducting qubits, $T_1$ refers to the "relaxation time" of the qubit, which in turn represents the characteristic time over which the qubit loses its energy to various intrinsic and extrinsic dissipation mechanisms in the qubit circuit and the environment. In other words, $T_1$ is a measure of how long it takes for the excited state of the qubit to decay to the ground state. $T_2$ is called the "phase coherence time" of the qubit. $T_2$ is a measure of how long the qubit maintains coherence in a phase that is predictable.

Infrared photons can decrease $T_2$ of superconducting qubits (and also $T_1$ for example by generating non-equilibrium quasiparticles in the device). The qubit-cavity system (where cavity usually refers to a superconducting microwave cavity) can be enclosed inside a black infrared-tight can, but the input and output coaxial lines of the qubit can still carry infrared photons. Some of the potential infrared radiation sources in a dilution fridge include, the blackbody radiation of the 4 kelvin (K) stage, high frequency noise originating from the amplification chain especially the HEMT amplifier which is commonly used in such experiments and mounted on the 4 K stage, thermal noise generated by the electronic equipment at room-temperature which is used to control the qubit and read out its quantum state, and heat sources on the various stages such as heaters, or microwave components that are not thermalized well.

Some issues concerning lossy infrared filters were discussed above. A few examples of lossy infrared filters may include copper-powder filters, resistive RLC meander line on-chip, eccosorb filters, slot lines in coaxial, and silver-epoxy filters. All of these examples of infrared filters are based on lossy materials. In general, the signal attenuation in these filters increases as the frequency increases. The addition of a lossy infrared filter to an input line of a qubit adds to the total attenuation of the line. However adding it to the output line can considerably degrade the SNR of the measurement of the microwave readout signal. Furthermore, these lossy infrared filters are not very well matched to the standard 50 ohm (Ω) measurement environment, and this mismatch causes multiple reflections in the lines and ripples in the microwave output signal (versus frequency). These lossy infrared filters can have about a 5-20 decibel (dB) loss at the readout frequency.

According to an embodiment, a microwave apparatus is provided that includes a microwave system. The microwave system has an input and an output connected to low-loss infrared filters which in turn connect to input and output microwave transmission lines. The input and output microwave transmission lines carry microwave signals into and out of the microwave system and carry in addition unwanted infrared radiation. The low-loss infrared filters which consist of distributed Bragg reflectors integrated into a transmission line configuration allow the input and output microwave signals to be transmitted into and out of the microwave system with little attenuation (e.g., below 2 dB) while blocking the unwanted infrared radiation in a certain bandwidth from reaching the microwave system.

Figure 1:
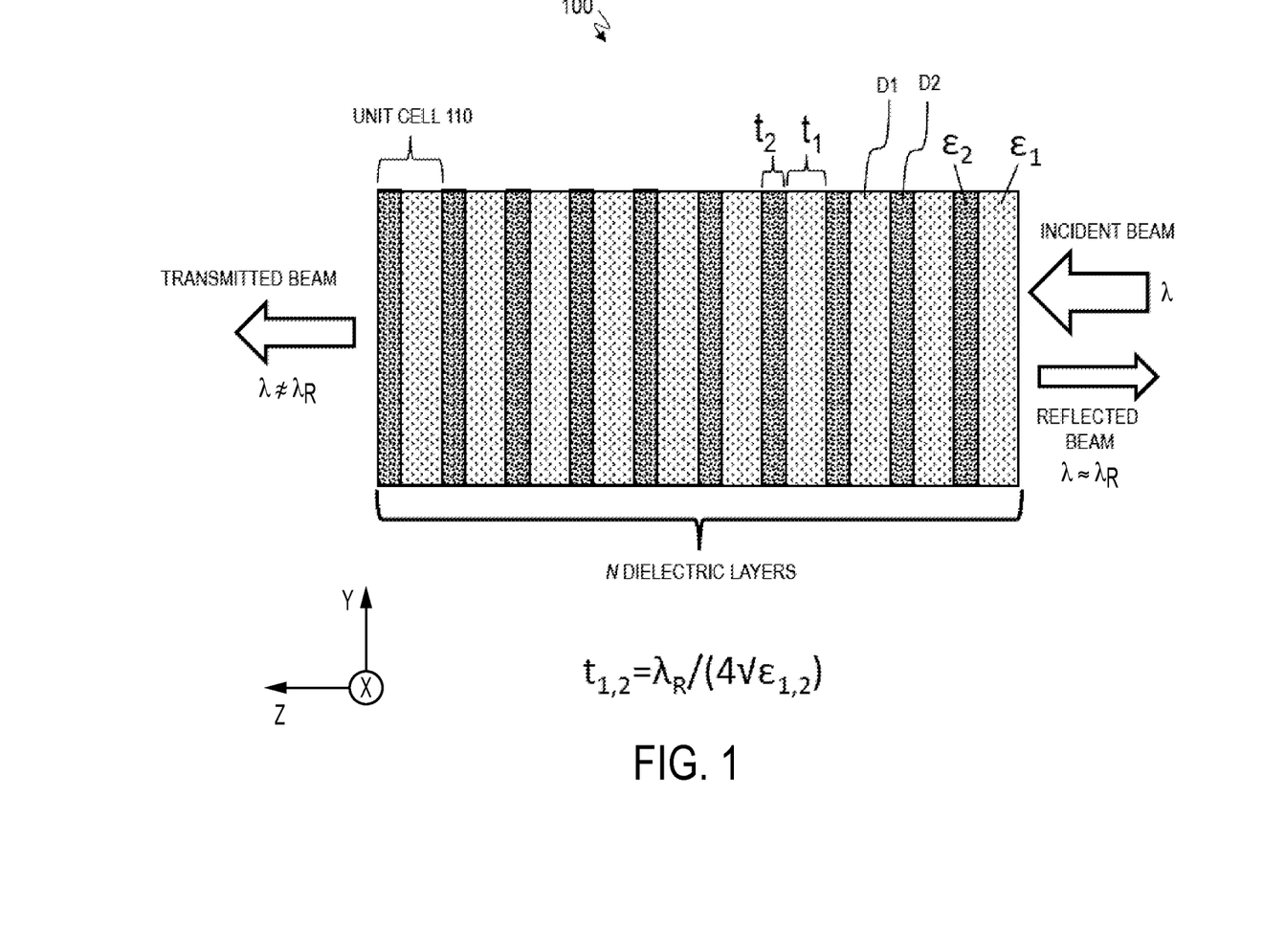
FIG. 1 is a cross-sectional view of a distributed Bragg reflector to be utilized according to an embodiment.

Now, turning to the low loss infrared filter, FIG. 1 is a cross-sectional view of a distributed Bragg reflector 100 to be utilized according to an embodiment. The distributed Bragg reflector 100 is a periodic structure which consists of N layers of dielectric materials, where N is the total number of layers. The unit cell 110 of this periodic structure comprises two different dielectric layers D1 and D2. In this example, dielectric layer D1 has a first thickness $t_1$ and dielectric layer D2 has a second thickness $t_2$. The dielectric layers D1 and D2 are adjacent to one another.

The dielectric layer D1 has a dielectric constant $\in_1$ and the dielectric layer D2 has a dielectric constant $\in_2$. The dielectric constants $\in_1$ and $\in_2$ are different values from one another. The combination of dielectric layers D1 and D2 is designed to reflect a center wavelength denoted as 4 (i.e., corresponding to a center frequency $f_R$), where R refers to the reflection coefficient for the electric field.

Given a particular dielectric constants $\in_1$ and $\in_2$ for the respective dielectric layers D1 and D2, the following formulas can be utilized to determine the respective thickness (e.g., in the z-axis) for each dielectric layer D1 and D2.

For dielectric layer D1, the thickness $t_1=\lambda_R/(4\sqrt{\in_1})$. For dielectric layer D2, the thickness $t_2=\lambda_R/(4\sqrt{\in_2})$. When an electromagnetic wave or beam is incident on the periodic structure, part of the beam is reflected back at the boundaries of the alternating dielectric layers due to impedance mismatch, while the remaining part gets transmitted. By accounting for all these multiple reflections and transmissions, it is possible to define a reflection parameter R and transmission parameter T for the whole structure, which satisfy the energy conservation condition, $|R|^2+|T|^2=1$. In the special case, where the wavelengths of the incident electromagnetic waves in the different layers are equal to about 4 times the thicknesses of the layers, the multiple reflections at the various boundaries constructively interfere together and result in total reflection of the waves. Thus, the range of frequencies around the center frequency $f_R$ for which the periodic structure acts as a perfect reflector defines the bandwidth of the device or in other words the bandwidth of the photonic stopband of the device.

Figure 2:
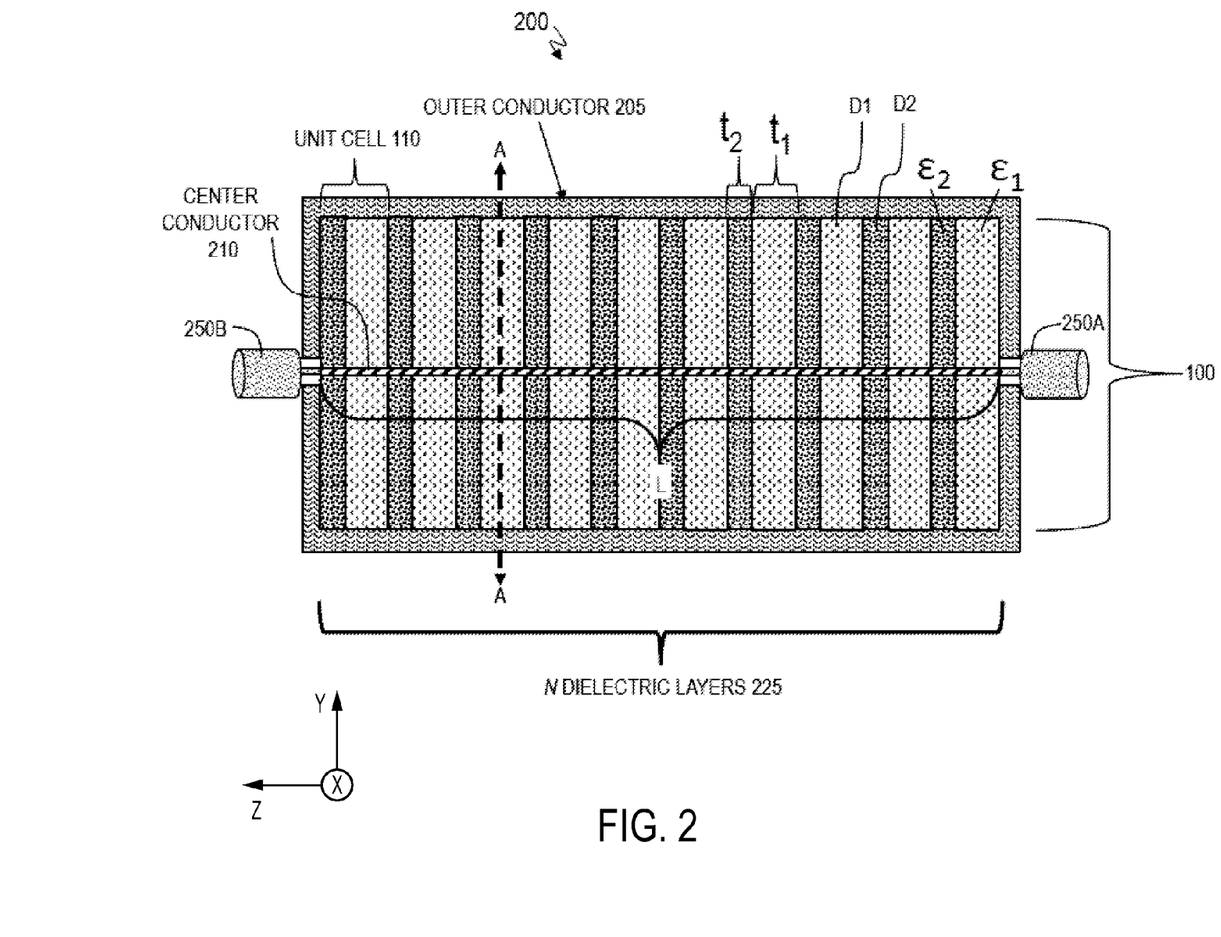
FIG. 2 is a schematic of a low-loss infrared filter implemented as a distributed Bragg reflector integrated into a microwave transmission line configuration according to an embodiment.

FIG. 2 is a schematic of a low-loss infrared filter 200 implemented to include the distributed Bragg reflector 100 in a stripline geometry according to an embodiment. The low-loss infrared filter 200 is matched to 50 ohms in the 5-15 GHz microwave band that is commonly used for qubit readout, is low loss in the 5-15 GHz band, and is reflective for infrared (IR) photons in an unwanted band.

The low-loss infrared filter 200 includes an outer conductor 205. The outer conductor 205 may be a three-dimensional rectangular copper box in one implementation. For example, the inner dimensions of the box (that house the alternating dielectric layers and the center conductor) may be approximately 25 mm, 4 mm, 10 mm along the x, y, z axes respectively. The walls of the outer conductor 205 can be a few millimeters thick. The exact thickness of the enclosure can vary depending on the screws used to assemble the filter together and on the screws used in order to mount the filter in the fridge. The outer conductor 205 (e.g., copper box) comprises N (total) dielectric layers 225. In this implementation, the dielectric layers D1 and D2 are shown, and the dielectric layers D1 and D2 form the unit cell 110 in the N (total) dielectric layers 225. The multiple dielectric layers D1 and D2 repeat in the periodic arrangement within the outer conductor 205. In another implementation, the outer conductor 205 may be cylindrical instead of a rectangular.

A center conductor 210 extends, from end to end, through the center of the outer conductor 205. The center conductor 210 may be a thin copper stripline. The center conductor 210 and the outer conductor 205 respectively connect to connectors 250A and 250B at opposite ends of the device 200 for transmitting and receiving signals. Although copper (in particular, oxygen-free high thermal conductivity (OFHC) copper) may be utilized for the center conductor 210 and the outer conductor 205, other materials such as gold, and silver may also be utilized.

The connectors 250A and 250B may be any microwave connector, such as subminiature version A (SMA) connectors, K connectors, etc. In one implementation, the connectors 250A and 250B may be made of Teflon with a dielectric constant $\in=2.1$. The outer conductor of the connectors is connected to the outer conductor 205 of the filter 200, whereas the center conductor of the connectors is connected to the center conductor 210 of the filter 200.

In one implementation, the alternating dielectric layers D1 and D2 may be Si ($\in=11.8$) and $SiO_2$ ($\in=3.9$). In another implementation, the alternating dielectric layers D1 and D2 may be Si and $Si_3N_4$ ($\in=7.5$). Other well-characterized dielectric materials such as Ge ($\in=16$) and GaAs ($\in=11$-$13$) can also be considered as possible candidates. In general, the higher the contrast in dielectric constants between the alternating dielectric layers D1 and D2 (for the same number of layers N), the larger the reflection magnitude at the center frequency $f_R$ and also the broader the bandwidth of the reflection (i.e., the bandwidth of the photonic stopband). One simple way to see this dependence is by considering the simple expressions for the reflection magnitude $$|R^{DBR}|^2 = \left|\frac{n_2^N - n_1^N}{n_2^N + n_1^N}\right|^2$$

and the reflection bandwidth $$\Delta f_R^{DBR} = \frac{4}{\pi} f_R^{DBR} \sin^{-1}\left(\frac{n_2 - n_1}{n_2 + n_1}\right)$$

of a distributed Bragg reflector (DBR) that is not integrated into a transmission geometry and whose initial and final dielectric layers at the two ends of the N-layer stack are made of the same material, where $n_1$ and $n_2$ are the refraction indices of the alternating layers given by $n_1=\sqrt{\in_1}$, $n_2=\sqrt{\in_2}$, and $f_R^{DBR}$ is the center frequency of the reflected signal. For example, for a stack of N=20 alternating dielectric layers with dielectric constants $\in_1=3.9$ and $\in_2=7.5$, and $f_R^{DBR}=83$ GHz, we get $|R^{DBR}|=0.96$, and $\Delta f_R^{DBR}=12$ GHz, whereas with $\in_1=3.9$ and $\in_2=11.8$ we get $|R^{DBR}|^2=0.9999$, and $\Delta f_R^{DBR}=29$ GHz. Another observation that can be made from the above expressions is that the reflection magnitude $|R^{DBR}|^2$ can be made arbitrarily close to unity by increasing N; however the bandwidth of the DBR is mainly set by the dielectric constants of the materials used and is independent on N.

Based on these design guidelines discussed herein (or using an electromagnetic simulation tool), and given a certain $f_R$ and stopband bandwidth, embodiments provide principles to design a low-loss infrared filter 200 that reflects off signals in the unwanted frequency range while allowing microwave frequencies in the range of interest 5-15 GHz to get transmitted with little (or no) reflection. According to an embodiment, the design process involve choosing the type of dielectric layers D1 and D2, calculating the thicknesses of the dielectric layers D1 and D2, deciding on the number (N) of layers D1 and D2 employed, and determining the dimensions of the stripline cross-section such that the higher order transverse magnetic field (TM) and traverse electric (TE) field supported by the stripline are suppressed as much as possible.

In one implementation, it noted that one technique to effectively increase the stopband bandwidth of the infrared radiation beyond what is achievable for a certain choice of dielectric layers is by concatenating multiple low-loss infrared filters 200 which have different center frequencies $f_R$ and whose stopband bandwidths partially overlap.

One concept appreciated in the device 200 (which allows microwave signals in the frequency range of interest (i.e., 5-15 GHz for qubit readout) to be transmitted through the device 200 with little reflection, while reflecting off most of the infrared radiation around $f_R$ (i.e., the center frequency which the device is designed to block)) is the large difference in scale of the corresponding wavelengths of these two frequency ranges (i.e., the frequency range of interest and the range around the center frequency $f_R$) compared to the thicknesses of the alternating layers. While in the case of the infrared radiation to be reflected off, the corresponding wavelengths in each dielectric layer are about four times the thickness of the layer. In the case of the desired microwave signals the corresponding wavelengths in each dielectric layer are at least 30 times longer than the thickness of the layer. This difference in scale in the wavelengths of the incident signals causes the infrared radiation to be significantly more affected by the rapid variation of the dielectric layers D1 and D2 than the microwave signals of interest, which effectively propagate along the stripline loaded by the periodic Bragg structure with very little perturbation.

In one implementation, the distributed Bragg structure that is integrated into a transmission line geometry (stripline or coax) is mainly effective in reflecting off transverse electromagnetic (TEM) waves, and possibly transverse electric (TE) waves. The device may be less effective in reflecting off transverse magnetic (TM) waves. Two known microwave techniques that can be possibly applied in this device 200 in order to suppress higher TE and TM modes in the stripline geometry is by using shorting screws between the ground planes (the top and bottom outer conductors 205) and by limiting the ground plane spacing to less than quarter wavelength of $f_R$ according to an embodiment.

It is noted that the distributed Bragg reflector 100 is integrated into a transmission line which together form the filter 200. Particularly, the outer conductor 205 and the center conductor 210 with the dielectric material in between is a stripline geometry and it is a type of a transmission line.

Figure 3:
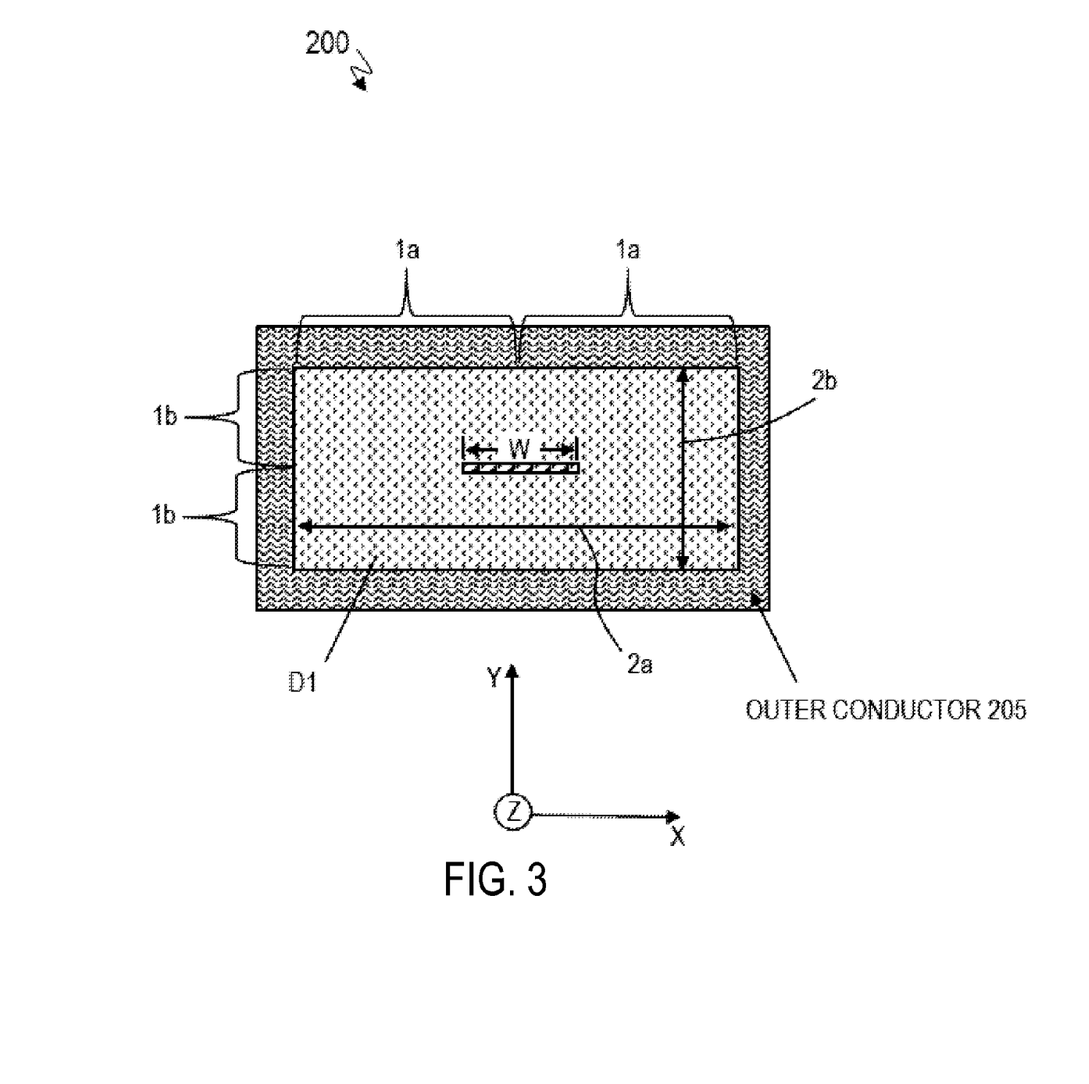
FIG. 3 is a cross-sectional view of the low-loss infrared filter according to an embodiment.

FIG. 3 is a cross-sectional view of the low-loss infrared filter 200 taken along line A-A according to an embodiment. FIG. 3 shows that the center conductor 210 has a width W in the x-axis.

Although only dielectric layer D1 is illustrated in the cross-sectional view of FIG. 3, the height of the dielectric layers D1 and D2 is height 2b in the y-axis. In particular, a height 1b extends up from the center of the dielectric layer D1 (dielectric layer D2 or center conductor 210) and another height 1b extends down. Given a certain choice of alternating dielectric layers D1 and D2 with dielectric constants $\in_1$ and $\in_2$ and corresponding thicknesses $t_1$ and $t_2$, it is possible to approximately evaluate the effective dielectric constant seen by microwave signals in the range of interest 5-15 GHz (which has relatively long wavelengths compared to $t_1$ and $t_2$) by using a weighted average given by $\in_{eff} \approx (\in_1 t_1 + \in_2 t_2)/(t_1 + t_2)$. Combining this calculated value of effective dielectric constant $\in_{eff}$ with the requirement that the microwave signals in the range of interest see a characteristic impedance $Z_0$ of 50 Ohm, yields an estimate for the ratio W/2b. Therefore, the dimensions W and b of the device 200 are not independent of each other. The design formula that yields a good estimate for the ratio W/2b is a known microwave textbook result given by $$\frac{W}{2b} = \begin{cases} x & \text{for } \sqrt{\varepsilon_{eff}} Z_0 < 120 \\ 0.85 - \sqrt{0.6 - x} & \text{for } \sqrt{\varepsilon_{eff}} Z_0 > 120 \end{cases}, \text{where}$$

-continued $$x = \frac{30\pi}{\sqrt{\varepsilon_{eff}} Z_0} - 0.441.$$

Again, although only dielectric layer D1 is illustrated in the cross-sectional view of FIG. 3, the width of each of the dielectric layers D1 and D2 is 2a in the x-axis. In particular, a width 1a extends left from the center of the dielectric layer D1 (dielectric layer D2 or center conductor 210) and another width 1a extends right. The particular condition that the width 2a should satisfy is 2a>>2b so that the fields around the center conductor are not perturbed by the sidewalls.

Figure 4:
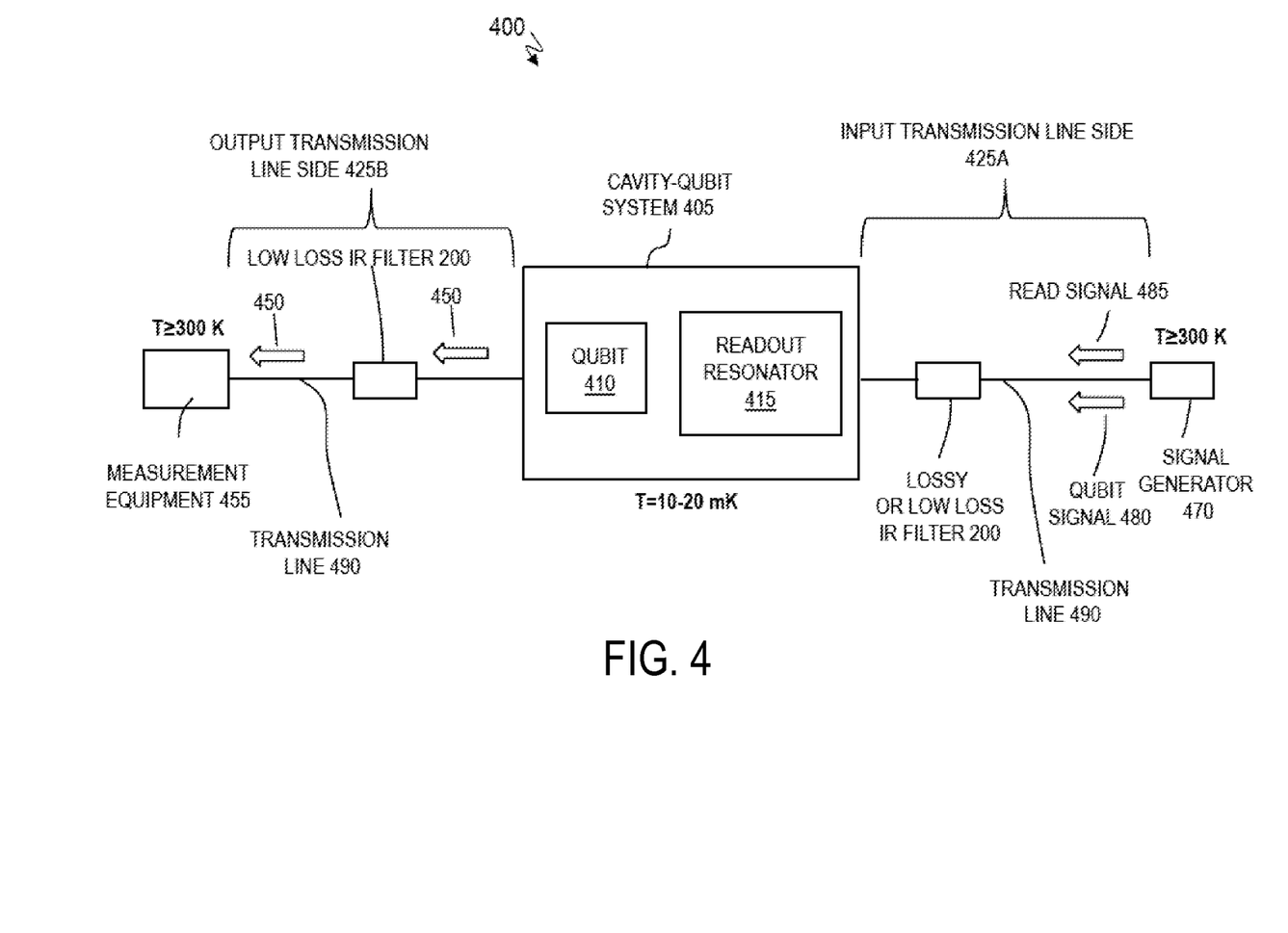
FIG. 4 is a schematic of an architecture/microwave apparatus incorporating the low-loss infrared filter according to an embodiment.

FIG. 4 is a schematic of an architecture/microwave apparatus 400 incorporating the low-loss infrared filter 200 according to an embodiment. The architecture/microwave apparatus 400 includes a superconducting cavity-qubit system 405. The superconducting cavity-qubit system 405 may be a two-dimensional (2D) microwave resonator or a three-dimensional (3D) microwave cavity.

The superconducting cavity-qubit system 405 includes a superconducting qubit 410 and a readout resonator 415 which enables reading out the state of the superconducting qubit 410. In one implementation, the superconducting qubit 410 may be a transmon qubit that includes a Josephson junction. The superconducting qubit 410 may be capacitively coupled to the readout resonator 415. The readout resonator 415 may be implemented as a coplanar waveguide resonator, and/or a 3D cavity. Note that although the superconducting qubit 410 may be a transmon qubit for explanation purposes, it is understood that the superconducting qubit 410 is not meant to be limited and applies to superconducting qubits that are not transmon qubits.

The superconducting cavity-qubit system 405 is connected to transmission lines 490 on an input transmission line side 425A and an output transmission line side 425B. The input transmission line side 425A may include a signal generator 470 configured to generate electromagnetic signal such as microwave signals at specific frequencies. The output transmission line side 425B includes the low-loss infrared filter 200 connected by transmission line 490, e.g., coaxial cable. Control and measurement equipment 455 may terminate and/or be included in the output transmission line side 425B to measure the microwave resonator readout signal 450, thus reading the state of the superconducting qubit 410.

In FIG. 4, the signal generator 470 is configured to generate a microwave signal at the resonance frequency of the superconducting qubit 410, and this qubit resonant frequency signal 480 is input into the cavity-qubit system 405 via the transmission line 490 on the input transmission line side 425A. On the input side 425A, the transmission line 490 may include a lossy IR filter in one implementation or the low-loss infrared filter 200 in another implementation. The input qubit signal 480, initializes, manipulates, or controls the superconducting qubit 410. To measure or infer the state of the superconducting qubit 410, a readout signal 485 is generated by the signal generator 470 or a different generator and sent to the cavity-qubit system 405. The readout signal 485 is input into the readout resonator 415 at resonance (or close to resonance). The output readout signal 450 leaving the readout resonator 415 after interacting dispersively with the qubit-carries information about the superconducting qubit 410 state, i.e., whether the qubit 410 is in the ground or excited state or in a superposition of these two states. This qubit information is encoded in either the phase and/or amplitude of the output readout signal 450.

The resonator readout signal 450 is transmitted on the microwave output transmission line 490 via the low-loss infrared filter 200 on the output transmission line side 425B. The low-loss infrared filter 200 is the distributed Bragg reflector 100 integrated into a transmission line geometry (i.e., a stripline in the case of FIG. 2) designed to 1) allow the transmission of the readout signal 450 to the measurement equipment 455 with no or very little dielectric and conductive loss <0.2 dB and with no or little return loss <−5 dB (defined here as $10 \log_{10}^{P_r/P_i}$, where $P_i$ and $P_r$ are the incident and reflected power respectively), and 2) reflect/block the infrared radiation coming down the output chain from higher temperature stages in the measurement/dilution setup. Thus, the low-loss infrared filter 200 protects the qubit-cavity system 405 from unwanted infrared radiation, while allowing readout microwave signals 450 to pass through with no or little degradation of the signal-to-noise ratio (e.g., <1.5 dB).

The input and output transmission line sides 425A and 425B may use waveguides as the transmission line 490 to physically connect various elements to the cavity-qubit system 405. Examples of the microwave transmission line may include a microstrip, coplanar waveguide, stripline or coaxial cable, etc.

It is noted that the cavity-qubit system 405, and/or the low-loss infrared filter 200 may be formed of superconducting materials including niobium, aluminum, niobium titanium nitride, and/or titanium nitride.

Figure 5:
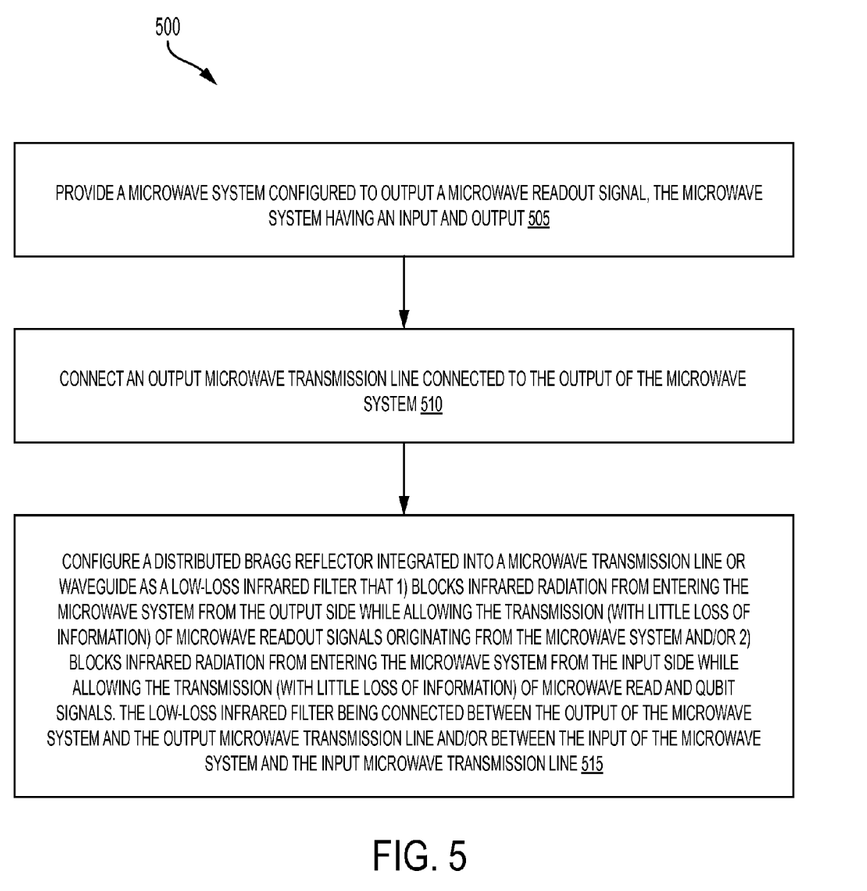
FIG. 5 is a flow chart of a method of configuring the microwave apparatus according to an embodiment.

Now turning to FIG. 5, a flow chart 500 of method for configuring the microwave apparatus 400 is provided according to an embodiment.

At block 505, the microwave system 405 (e.g., cavity-qubit system) is configured to output a microwave readout signal 450, and the microwave system 405 has an input and output.

At block 510, an output microwave transmission line 490 is connected to the output of the microwave system 405.

At block 515, the distributed Bragg reflector 100 is integrated into a microwave transmission line or waveguide as a low-loss infrared filter 200 that blocks infrared radiation from entering the microwave system 405 from the output side while allowing the transmission (with little loss of information) of microwave readout signals originating from the microwave system 405 or traversing the microwave system 405 from the input side 425A. The low-loss infrared filter 200 is connected to the output of the microwave system 405 and the output microwave transmission line 490. Little loss of information of the microwave readout signals 450 means little to no degradation of the signal-to-noise ratio of the transmitted microwave readout signal 450, which means the microwave readout signal 450 is attenuated by less than 30% percent.

The distributed Bragg reflector 100 comprises a unit cell 110 of at least two different dielectric layers D1 and D2. The unit cell 110 repeats to have a total of N dielectric layers 225.

The distributed Bragg reflector 100 comprises a first dielectric layer D1 and a second dielectric layer D2 adjacent to the first dielectric layer. The first dielectric layer D1 has a first dielectric constant $\in_1$. The second dielectric layer D2 has a second dielectric constant $\in_2$ different from the first dielectric constant $\in_1$.

The first dielectric layer D1 has a first thickness $t_1$, and the second dielectric layer D2 has a second thickness $t_2$. The first thickness is different from the second thickness.

The distributed Bragg reflector 100 comprises a center conductor stripline 210 formed through the first dielectric layer D1 and the second dielectric layer D2. The center conductor stripline 210 is copper. The distributed Bragg reflector 100 has an outer conductor 205 encompassing the first dielectric layer D1 and the second dielectric layer D2, and the center conductor stripline 210 extends through the outer conductor 205 in a lengthwise direction. The distributed Bragg reflector 100 comprises a first connector 250A and a second connector 250B, both connected to opposite ends of the center conductor stripline 210 in the lengthwise direction. The outer conductors of the first and second connectors 250A and 250B connect to the outer conductor 205 of the low-loss filter 200.

The input microwave transmission line is connected to the input of the microwave system 405. Another distributed Bragg reflector 100, integrated into the transmission line geometry, is configured as another low-loss infrared filter 200 that blocks infrared radiation while allowing transmission of a microwave read signal 485 with little or no degradation of the signal-to-noise ratio of the transmitted microwave read signal and while allowing transmission of a microwave qubit signal 480 with little or no degradation of the signal-to-noise ratio of the transmitted microwave qubit signal. Accordingly, the microwave read signal 485 and the microwave qubit signal 480 may be attenuated by less than 30% percent.

Figure 6:
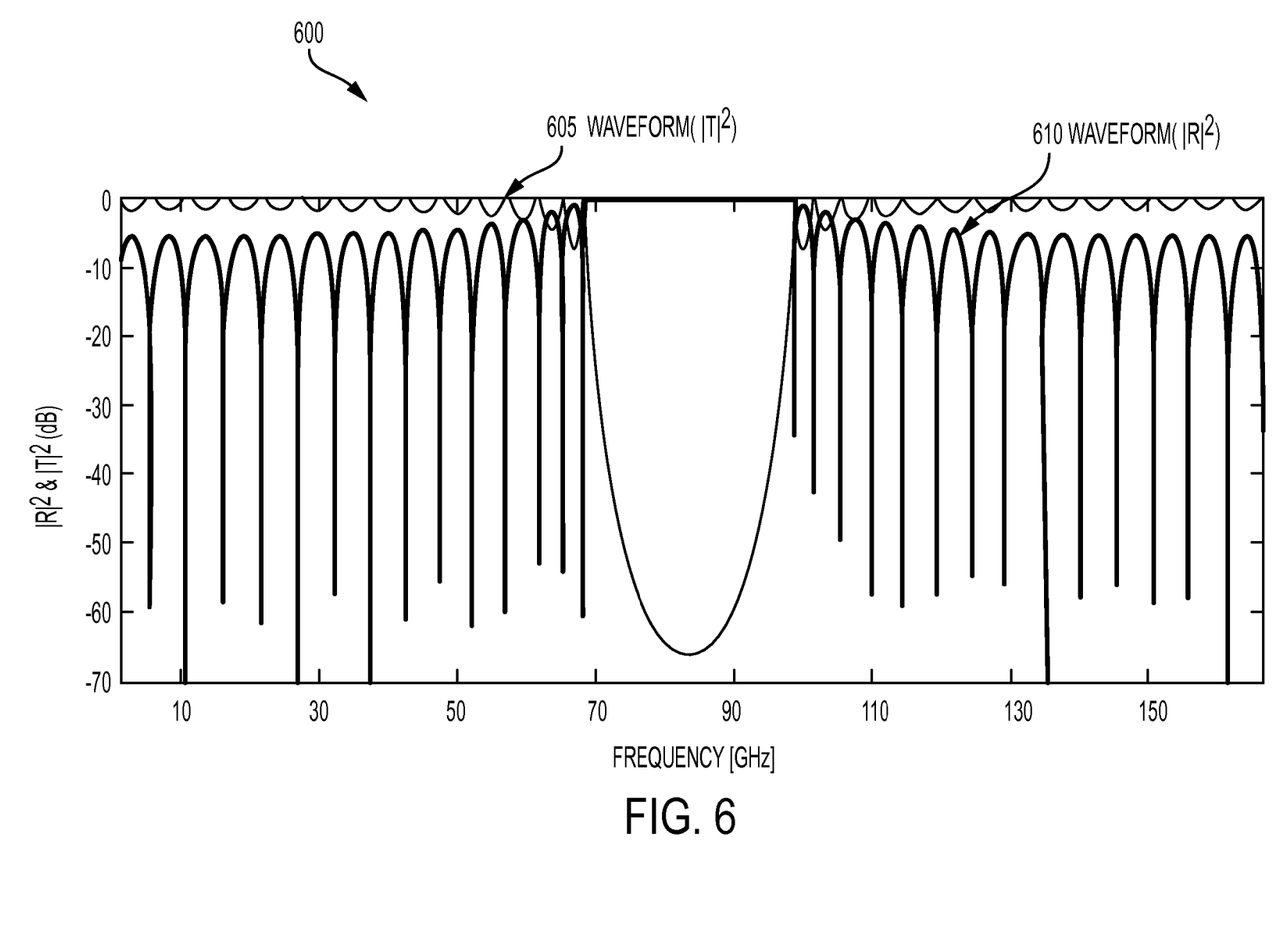
FIG. 6 is a graph illustrating a calculated reflection waveform and transmission waveform versus frequency of one example of a low-loss infrared filter according to an embodiment.

FIG. 6 is a graph 600 illustrating a waveform 610 for the reflection R and a waveform 605 for the transmission T of the low-loss infrared filter 200 comprising the distributed Bragg reflector 100 according to an embodiment. An example design for the distributed Bragg reflector and setup is discussed but it should be appreciated that the design may be adjusted for different blackbody radiation temperatures and/or to reflect/block different frequencies.

In this design example, the low loss infrared filter 200 is designed to reflect/block an infrared frequency band having a center frequency at $f_R$=83 gigahertz (GHz) whose wavelength in vacuum is given by $\lambda_R = c/f_R$, where c is the velocity of light in vacuum. The reflected infrared frequency band may be about 30 GHz. In the graph 600, the x-axis depicts the frequency in GHz. The y-axis depicts in decibels (dB) the power reflection parameter $|R|^2$ and the power transmission parameter $|T|^2$ of the low-loss infrared filter 200.

In this design example, the dielectric layers D1 and D2 are SiO ($\in$=3.9) and Si ($\in$=11.8), respectively. The distributed Bragg reflector 100 has N total layers where N=30, has thickness $t_1$=456 μm (for dielectric layer D1), and has thickness $t_2$=262 μm (for dielectric layer D2). The length of the center conductor 210 corresponds to the thickness of the total N dielectric layers.

The microwave output transmission line side 425B is designed to have all elements with a characteristic impedance of 50Ω in the range 1-15 GHz. Accordingly, the experimenters design the low-loss infrared filter 200, cast in the form of a stripline loaded with a distributed Bragg reflector, to have a matching characteristic impedance of $Z_0$=50Ω. The effective dielectric constant $\in_{eff}$ of the dielectric layers D1 and D2 as seen by microwave signals in the range 1-15 GHz is about 6.8 which can be approximately estimated as the weighted average of the dielectric constants of the two alternating dielectric layers $\in_{eff} \approx (\in_1 t_1 + \in_2 t_2)/(t_1 + t_2)$. Regarding the dimensions (inside) of the copper box (outer conductor) 205—which roughly yields a characteristic impedance of $Z_0$=50Ω in the frequency range of interest—the width 2a of each of the dielectric layers D1, D2 corresponds to a=12.5 mm such that 2a=25 mm, and the height $2b$ of each of the dielectric layers D1, D2 corresponds to b=2 mm such that $2b$=4 mm. The width W of the center conductor 210 (e.g., copper stripline) is W=1.14 mm and the length L of the center conductor is L=10.77 mm.

The transmission waveform ($|T|^2$) 605 shows that the low-loss infrared filter 200 has more than 60 dB attenuation at the center frequency 83 GHz; which means that the transmitted power through the low-loss infrared filter 200 at the center frequency 83 GHz is reduced by a factor of more than $10^6$. The waveform also shows that the device effectively blocks transmission around the center frequency within the band 68-98 GHz (which corresponds to $|T|^2 \leq 0.5$ in linear scale, and $|T|^2 \leq -3$ dB in logarithmic scale). Furthermore, the transmission in the microwave band of interest 5-15 GHz ranges is between 0 to −1.4 dB, which means that readout signals that fall within this band experience, in general, very little attenuation when passing through the device. In particular, those readout signals have frequencies that correspond to transmission parameters that are very close to 0 dB within that band.

The reflection waveform ($|R|^2$) 610 shows that the low-loss infrared filter 200 has 0 dB reflection (unity reflection) at the center frequency 83 GHz, and almost unity reflection in the IR band 68-98 GHz (which corresponds to $|R|^2 \geq 0.5$ in linear scale, and $|R|^2 > -3$ dB in logarithmic scale), thus effectively blocking power transmission within this band.

It will be noted that various microelectronic device fabrication methods may be utilized to fabricate the components/elements discussed herein as understood by one skilled in the art. In microelectronic and nanoelectronic device fabrication, the various processing steps fall into four general categories: deposition, removal, patterning, and modification of electrical properties.

Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others.

Removal is any process that removes material from the wafer: examples include etch processes (either wet or dry), and chemical-mechanical planarization (CMP), etc.

Patterning is the shaping or altering of deposited materials, and is generally referred to as lithography. For example, in conventional lithography, the wafer is coated with a chemical called a photoresist; then, a machine called a stepper focuses, aligns, and moves a mask, exposing select portions of the wafer below to short wavelength light; the exposed regions are washed away by a developer solution. After etching or other processing, the remaining photoresist is removed. Patterning also includes electron-beam lithography.

Modification of electrical properties may include doping, such as doping transistor sources and drains, generally by diffusion and/or by ion implantation. These doping processes are followed by furnace annealing or by rapid thermal annealing (RTA). Annealing serves to activate the implanted dopants.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A microwave apparatus, the apparatus comprising:
   a microwave system configured to output a microwave readout signal, the microwave system having an input and an output;
   an output microwave transmission line connected to the output of the microwave system; and
   a distributed Bragg reflector, integrated into a transmission line geometry, configured as a low-loss infrared filter that blocks infrared radiation while allowing transmission of the microwave readout signal, the low-loss infrared filter being connected to the output microwave transmission line.

2. The apparatus of claim 1, further comprising:
   an input microwave transmission line connected to the input of the microwave system; and
   another distributed Bragg reflector, integrated into the transmission line geometry, configured as another low-loss infrared filter that blocks infrared radiation while allowing transmission of a microwave read signal and a microwave qubit signal;
   wherein the low-loss infrared filter is connected to the input microwave transmission line.

3. The apparatus of claim 1, wherein the distributed Bragg reflector comprises a unit cell of at least two different dielectric layers.

4. The apparatus of claim 3, wherein the unit cell repeats to have a total of N dielectric layers.

5. The apparatus of claim 1, wherein the distributed Bragg reflector comprises a first dielectric layer and a second dielectric layer adjacent to the first dielectric layer.

6. The apparatus of claim 5, wherein the first dielectric layer has a first dielectric constant; and
   wherein the second dielectric layer has a second dielectric constant different from the first dielectric constant.

7. The apparatus of claim 5, wherein the first dielectric layer has a first thickness; and
   wherein the second dielectric layer has a second thickness.

8. The apparatus of claim 7, wherein the first thickness is different from the second thickness.

9. The apparatus of claim 5, wherein the low-loss infrared filter has a center conductor stripline formed through the first dielectric layer and the second dielectric layer.

10. The apparatus of claim 9, wherein the center conductor stripline is a conductive metal.

11. The apparatus of claim 9, wherein the low-loss infrared filter has an outer conductor encompassing the first dielectric layer and the second dielectric layer, the center conductor stripline extending through the outer conductor in a lengthwise direction;
    wherein the low-loss infrared filter comprises a first connector and a second connector, both connected to opposite ends of the center conductor stripline in the lengthwise direction; and wherein an outer conductor of the first and second connectors connects to the outer conductor of the low-loss infrared filter.

* * * * *